(12) United States Patent
Yoon

(10) Patent No.: US 8,922,047 B2
(45) Date of Patent: Dec. 30, 2014

(54) WIND TURBINE

(76) Inventor: Jeen Mok Yoon, Bupyeong-gu (KR)

( * ) Notice: Subject to any disclaimer, the term of this patent is extended or adjusted under 35 U.S.C. 154(b) by 281 days.

(21) Appl. No.: 13/510,031

(22) PCT Filed: Dec. 28, 2010

(86) PCT No.: PCT/KR2010/009413
§ 371 (c)(1),
(2), (4) Date: May 16, 2012

(87) PCT Pub. No.: WO2011/081401
PCT Pub. Date: Jul. 7, 2011

(65) Prior Publication Data
US 2012/0286519 A1    Nov. 15, 2012

(30) Foreign Application Priority Data
Dec. 30, 2009   (KR) .................. 10-2009-0134940

(51) Int. Cl.
| F03D 9/00 | (2006.01) |
| H02P 9/04 | (2006.01) |
| F03D 11/02 | (2006.01) |
| F03D 11/00 | (2006.01) |
| F03D 7/02 | (2006.01) |

(52) U.S. Cl.
CPC ............ *F03D 11/02* (2013.01); *F03D 11/0058* (2013.01); *Y02E 10/722* (2013.01); *F03D 7/0204* (2013.01); *Y02E 10/723* (2013.01); *F03D 11/024* (2013.01)
USPC ............................................. 290/55; 290/44

(58) Field of Classification Search
CPC ... F03D 11/02; F03D 11/024; F03D 11/0058; F03D 7/0204; Y02E 10/722; Y02E 10/723
USPC ...................................................... 290/44, 55
See application file for complete search history.

(56) References Cited

U.S. PATENT DOCUMENTS 4,613,760 A * 9/1986 Law ............................ 290/1 C
2007/0164567 A1* 7/2007 Luetze et al. ................... 290/44
(Continued)

FOREIGN PATENT DOCUMENTS

| JP | 61-192869 A | 8/1986 |
| JP | 2004-108162 A | 4/2004 |

(Continued)

OTHER PUBLICATIONS

Patent Abstracts of Japan, Publication No. 61-192869, dated Aug. 27, 1986, 1 page.

(Continued)

*Primary Examiner* — Tulsidas C Patel
*Assistant Examiner* — Thomas Quigley
(74) *Attorney, Agent, or Firm* — Osha Liang LLP

(57) ABSTRACT

A horizontal-axis wind turbine includes a rotor having a hub and blades rotatable by wind; a nacelle assembly for rotatably supporting the rotor through a main shaft, the main shaft being connected to the rotor; a tower for rotatably supporting the nacelle assembly; a dynamo placed near to a location at which the tower is built up; a rotatable vertical shaft orthogonally disposed to the main shaft inside the tower for transferring a rotating force of the main shaft to the dynamo; and a repulsive torque-balancing mechanism for transferring a rotating force of the nacelle assembly, the rotating force of the nacelle assembly being derived from repulsive torque due to a load of the dynamo, to the vertical shaft in a direction in which the repulsive torque is balanced.

9 Claims, 18 Drawing Sheets

(56) References Cited

U.S. PATENT DOCUMENTS

2012/0274075 A1* 11/2012 Kroger ........................ 290/55
2013/0277971 A1* 10/2013 Cho et al. .................... 290/44

FOREIGN PATENT DOCUMENTS

| KR | 20-0279047 | Y1 | 6/2002 |
| KR | 10-0444616 | B1 | 8/2004 |
| WO | 95/21326 | A1 | 8/1995 |

OTHER PUBLICATIONS

Patent Abstracts of Japan, Publication No. 2004-108162, dated Apr. 8, 2004, 1 page.

International Search Report issued in PCT/KR2010/009413, mailed on Aug. 22, 2011, 3 pages.

Written Opinion issued in PCT/KR2010/009413, mailed on Aug. 22, 2011, 3 pages.

* cited by examiner

WIND TURBINE

TECHNICAL FIELD

The present invention relates to a wind turbine, and more particularly, to a horizontal-axis wind turbine that can exhibit high output and which has reduced construction and maintenance costs.

BACKGROUND ART

As is well known in the art, a wind turbine is an apparatus that converts the energy of the wind into useful electrical energy. The wind turbine generates electricity using the rotary force of blades, the motion being produced when the wind rotates the blades. Since the wind turbine uses the wind, which is an unlimited clean source of energy, as a power source to perform non-polluting power generation, the effect achieved by substituting it for fossil fuel is great. In addition, by installing the wind turbine in under-developed areas, coastal areas, and mountainous areas, it is possible to rationalize the use of the land of a country and supply competitive power. Further, when a massive wind power plant complex is constructed in a specific region, such as an island, the wind turbines can also serve as tourist attractions. Therefore, the wind turbine is attracting more attention.

Since the wind turbine has been constructed in the form of a 'rotor blade type' (the so-called propeller type) wind turbine by the Danish physicist Poul la Cour in 1891, it is currently in the spotlight and is increasing in size. In addition, in wind power generation, the output of the wind turbine varies depending on the conditions of its construction. For example, the strength of the wind and the size of a wind turbine are very important factors, since more wind energy can be produced when the wind is faster and the wind turbine is larger. In addition, locating a wind turbine higher is better and generates more power than a lower wind turbine does because the wind becomes stronger as the height increases. Wind blowing at an average velocity of 4 m/s or more is required in order to use wind to generate electric power. Herein, the velocity of the wind refers to its velocity at the height at which the blades of the wind turbine are present not its velocity on the ground that people stand on.

Such wind turbines are classified according to the direction of the rotary shaft of the blades, into a vertical-axis wind turbine, in which the rotary shaft is provided perpendicular to the ground surface, and a horizontal-axis wind turbine, in which the rotary shaft is provided parallel to the ground surface. The horizontal-axis wind turbine is easy to construct because of a simple structure. However, the horizontal-axis wind turbine is greatly influenced by the wind. Although the vertical-axis wind turbine can be constructed in a desert or plain regardless of the direction of the wind, its efficiency is disadvantageously lower than that of the horizontal-axis wind turbine.

FIGS. 1A and 1B show an example of a rotor blade type wind turbine having a typical horizontal-axis structure. As shown in FIGS. 1A and 1B, the rotor blade type wind turbine includes a rotor 10, which converts wind power into mechanical rotation energy, a nacelle assembly 20, which includes components for converting the rotation energy into electrical energy, and a tower 30, which supports the nacelle assembly 20. The wind turbine is completed by burying a foundation insert 40, which is supposed to be under the tower 30, in the location in which foundation work is firmly finished, and sequentially assembling the tower 30, the nacelle assembly 20, and the rotor 10 over the foundation insert 40. The rotor 10 includes a hub-nose cone assembly 14, which includes a plurality of blades 12, for example, three blades, which are arranged radially at equal intervals. The hub-nose cone assembly 14 is connected to the main shaft 22, which is supported on a base frame 24 inside the nacelle assembly 20. A speed-up gearbox 26, a disc brake 28, and a dynamo 50 are assembled sequentially to the main shaft 22. The blades 12 are disposed in an orthogonal direction to the main shaft 22, and therefore the hub-cone assembly 14 rotates when the wind blows the blades. This rotating force is transferred to the main shaft 22, and the number of rotations of which is increased by the speed-up gearbox 26, thereby driving the dynamo 50 that generates power.

In wind power generation, it is most preferable that a so-called free yaw state be realized, since the availability of wind energy is high when the plane on which the blades rotate (i.e., the rotating plane of the blades) intersects the direction of the wind at right angles. However, since the direction of the wind changes constantly, there occurs a yaw error in which the rotating plane of the blades no longer intersects the direction of the wind and deviates at right angles. As the yaw error becomes greater, the availability of the wind drops.

In order to prevent this problem, the wind turbine also includes an active yawing system 60, which is provided in the nacelle assembly 20, as specifically shown in FIG. 2. The active yawing system 60 includes a ring gear 62, which is mounted on a top flange formed on the upper end of the tower, and a wind direction control motor 64, which interlocks with the ring gear 62. When the direction of the wind changes, the wind direction control motor 64, interlocking with the ring gear 62, is operated to rotate the nacelle assembly 20, thereby realizing active yaw control. Accordingly, the blades 12 are operated to constantly face the wind. In the figures, reference numeral 66 indicates an anemoscope.

FIG. 3 shows a rotor blade type wind turbine having a typical horizontal structure in which a dynamo is installed on a ground or below a tower. As shown in FIG. 3, the nacelle assembly 20 is supported on the upper portion of the tower 30 by a bearing assembly 82. In this state, the rotating force of the main shaft 22 is transferred through a drive bevel gear 72a to the vertical tower shaft 76 having a following bevel gear 74a, which is engaged with the drive bevel gear 72a, and is then transferred through a following bevel gear 72b to a speed-up gearbox 26 via a rotating shaft 78. The speed-up gearbox 26 is used to drive the dynamo 50. With this configuration, the dynamo 50 may be provided on the ground or at a predetermined height not far above the ground. However, in this case, when the rotating force of the blades 12 of the rotor 10 is transferred through the drive bevel gear 74b, which is coupled to the lower end of the vertical tower shaft 76, and through the following bevel gear 72b of the rotating shaft 78, the tower shaft 76 is subject to repulsive torque (shown as dotted lines) that is applied to the drive bevel gear 74b from the following bevel gear 72b. The repulsive torque causes the nacelle assembly 20 to rotate. Therefore, in order to preclude the repulsive torque, a strong rotation prevention function has to be disadvantageously added to the inside of the active yawing system. Accordingly, the wind turbine is generally provided inside the nacelle assembly instead of being provided on the ground or at a position close to the ground even if the cost increases.

In general, in the case of a megawatt level wind turbine, the tower is designed to be approximately from 50 to 80 m in height in consideration of the direction of the wind and other factors. In addition, the tower is required to support a total tower head mass of substantially 100 tons, i.e., the load of the nacelle assembly, including the dynamo and the rotor on the upper portion thereof. Therefore, the tower has to be designed to have a structural strength meeting such conditions, and the top flange of the tower is large, the outer diameter thereof being nearly 3 m, which entails an increase of construction and maintenance costs.

In addition, since the blades are linear, a strong reaction increases energy loss, and the rotating blades cause a large amount of aerodynamic loss. In the case of a down wind, a low pressure area is formed in the backwash of the tower, thereby increasing noise and causing fatigue to the blades.

DISCLOSURE OF INVENTION

Technical Problem

In view of the above, the present invention provides a wind turbine, in which the rotational energy of a rotor is transferred to a dynamo placed near a location at which the wind turbine is constructed.

Further, the present invention provides a wind turbine in which free yaw is realized without an active yawing system by balancing repulsive torque due to the load of the wind turbine.

Furthermore, the invention provides a wind turbine capable of increasing output and reducing noise that otherwise would occur when blades pass through a low pressure area formed in the backwash of the tower.

Solution to Problem

In accordance with an embodiment of the present invention, there is provided a horizontal-axis wind turbine including: a rotor having a hub and blades rotatable by wind; a nacelle assembly for rotatably supporting the rotor through a main shaft, the main shaft being connected to the rotor; a tower for rotatably supporting the nacelle assembly; a dynamo placed near to a location at which the tower is built up; a rotatable vertical shaft orthogonally disposed to the main shaft inside the tower for transferring a rotating force of the main shaft to the dynamo; and a repulsive torque-balancing mechanism for transferring a rotating force of the nacelle assembly, the rotating force of the nacelle assembly being derived from repulsive torque due to a load of the dynamo, to the vertical shaft in a direction in which the repulsive torque is balanced.

Preferably, the repulsive torque-balancing mechanism includes: a casing disposed under the vertical shaft for rotatably supporting a horizontal shaft, wherein the horizontal shaft is engaged with the vertical shaft and is orthogonal to the vertical shaft; a lower support, orthogonally disposed to the vertical axis, for rotatably supporting the casing, and for rotatably supporting a rotating shaft of the dynamo; and a transferring unit for transferring the rotating force of the nacelle assembly to the casing.

Preferably, the horizontal-axis wind turbine further comprises a motion converting mechanism for transferring a rotating force of the horizontal shaft, which is rotatable with respect to the vertical shaft, to the rotating shaft.

Preferably, the motion converting mechanism includes: a first converting section for converting the rotating force of the horizontal shaft into a linear reciprocal motion that intersects a direction of the vertical shaft at right angles; a second converting section for converting the linear reciprocal motion into a rotating force and transfers the rotating force to the rotating shaft; and a thrust bearing assembly connected between the first and second converting sections, and being rotatable with respect to the vertical shaft.

Preferably, each of the first and second converting sections includes any one selected from among a Scotch yoke, a pair formed by a crank and a connecting rod, a pair formed by a circular cam and a slider, a pair formed by a cam having a circular groove and a slider, a pair formed by a swash plate cam and a slider.

Preferably, the conversion assembly includes a plurality of the first converting sections and a plurality of the second converting sections.

Preferably, the transferring unit includes a hollow section, which is attached to a lower portion of the nacelle assembly, surrounds parts of the vertical shaft and the casing, and is attached to a lower portion of the casing.

Preferably, the transferring unit includes a balance shaft, which is engaged with a lower portion of the nacelle assembly and with a lower portion of the casing.

Preferably, the horizontal-axis wind turbine further comprises a tower hood, the tower hood is attached to a lower end of the nacelle assembly, surrounds an upper portion of the tower, and is positioned to be eccentric in a direction opposite the rotor with respect to the tower.

Preferably, the location includes a ground on which the wind turbine is constructed.

Preferably, the wind turbine comprises an offshore wind turbine in the sea, and the location includes an upper surface of a float supporting the offshore wind turbine.

According to the present invention, the rotation energy of the rotor is transferred to the dynamo through the tower shaft, and the repulsive torque forced to the tower shaft is balanced without an active yawing system, thereby lighting the overall weight and reducing construction cost.

In addition, the time in which a yaw error occurs can be reduced using the lightweight of the nacelle assembly and the streamlined eccentric hood, which helps the nacelle face the windward direction. Furthermore, since the dynamo is placed on a location near the ground, maintenance of the dynamo is made easy.

BRIEF DESCRIPTION OF DRAWINGS

The above and other objects and features of the present invention will become apparent from the following description of preferred embodiments given in conjunction with the accompanying drawings, in which.

BEST MODE FOR CARRYING OUT THE INVENTION

Figure 1A:
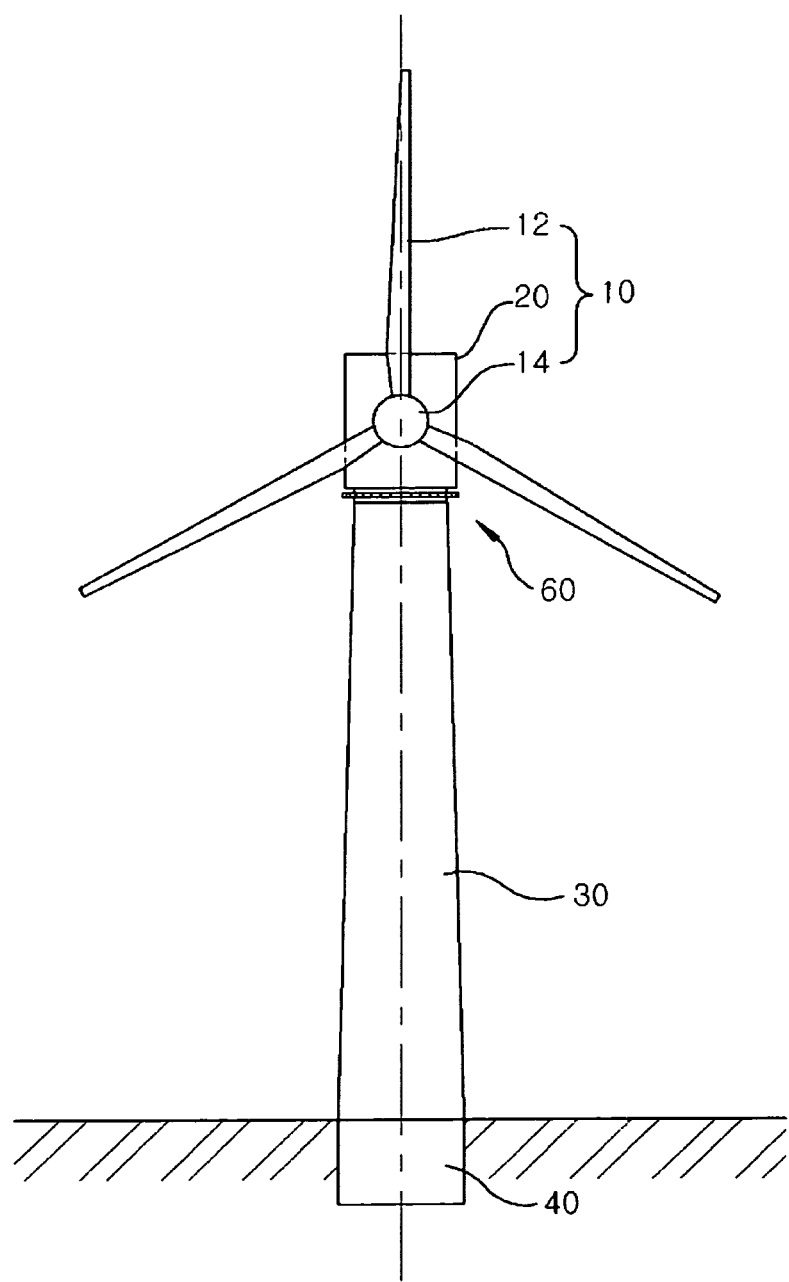
FIGS. 1A and 1B are schematic rear and side elevation views showing a rotor blade type wind turbine of the related art.
Figure 1B:
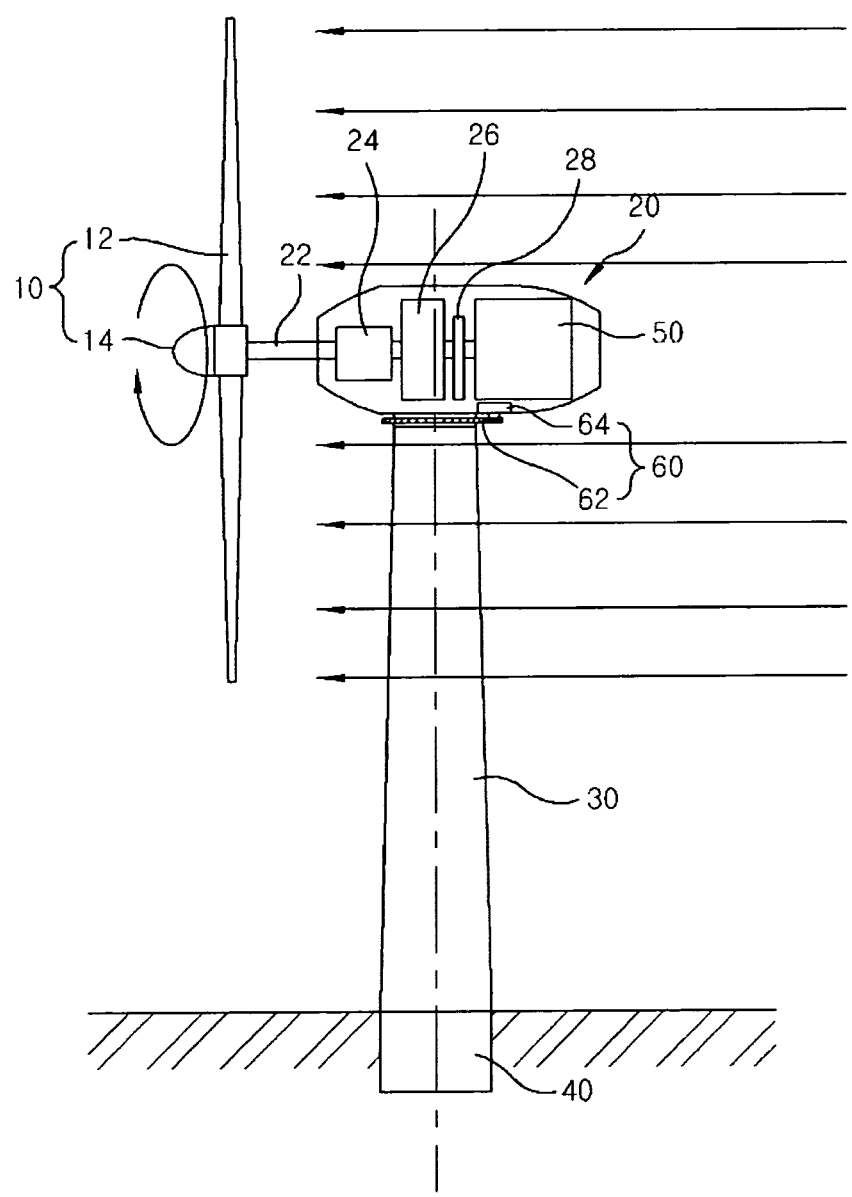
Figure 2:
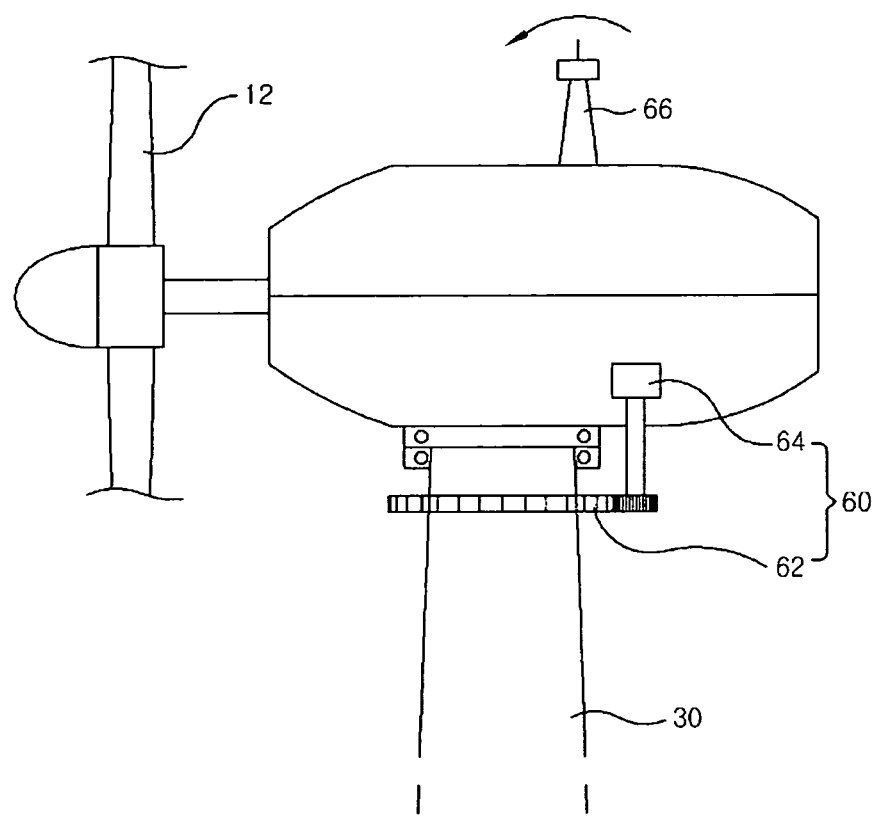
FIG. 2 is a detailed view of the yawing system shown in FIGS. 1A and 1B.
Figure 3:
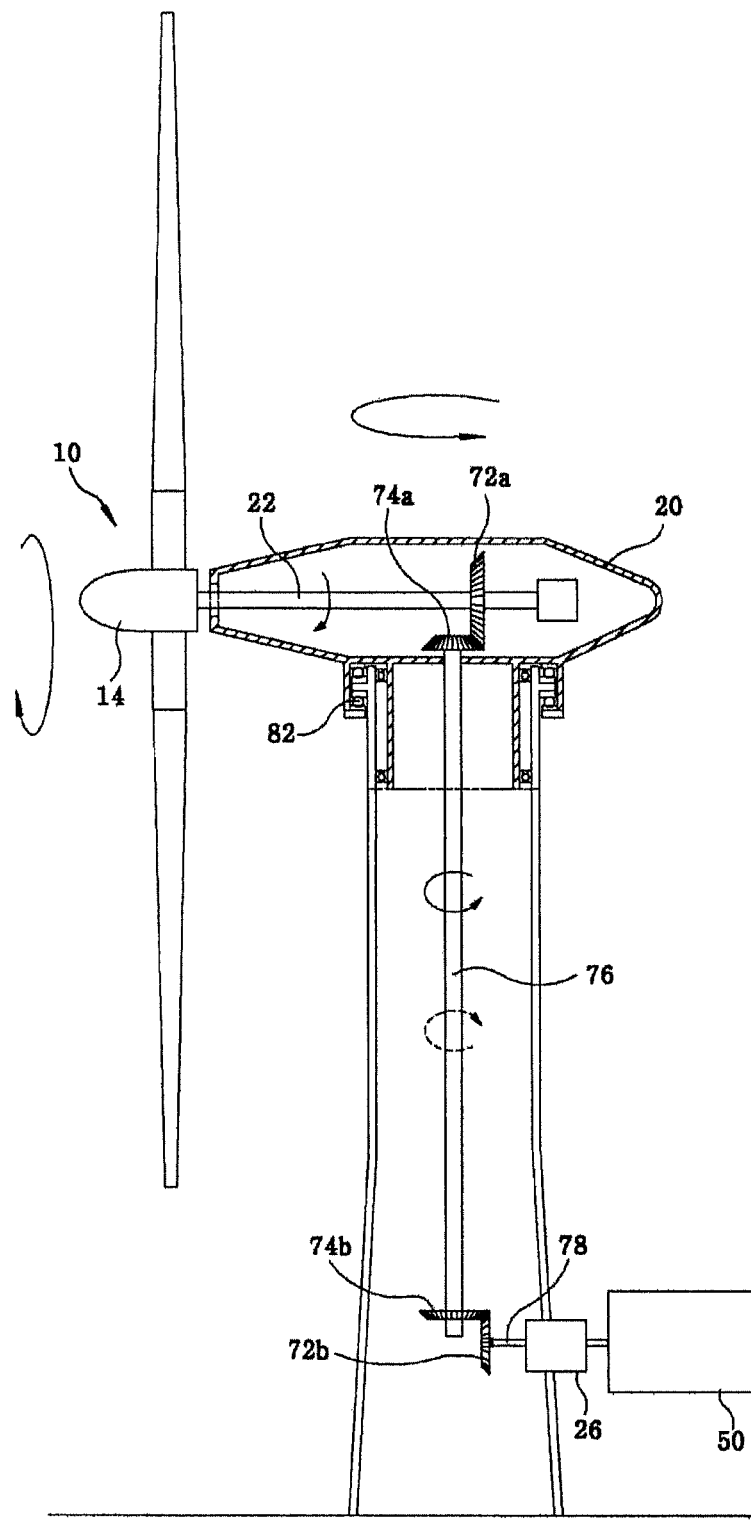
FIG. 3 is a conceptual view explaining repulsive torque, which occurs when the rotating force of the main shaft is transferred to a dynamo, which is on the ground, through a vertical tower shaft.

Hereinafter, preferred embodiments of the present invention will be described in detail with reference to the accompanying drawings so that they can be readily implemented by those skilled in the art. Throughout the drawings, the same reference numerals are used throughout the different drawings to designate the same or similar components.

Figure 4:
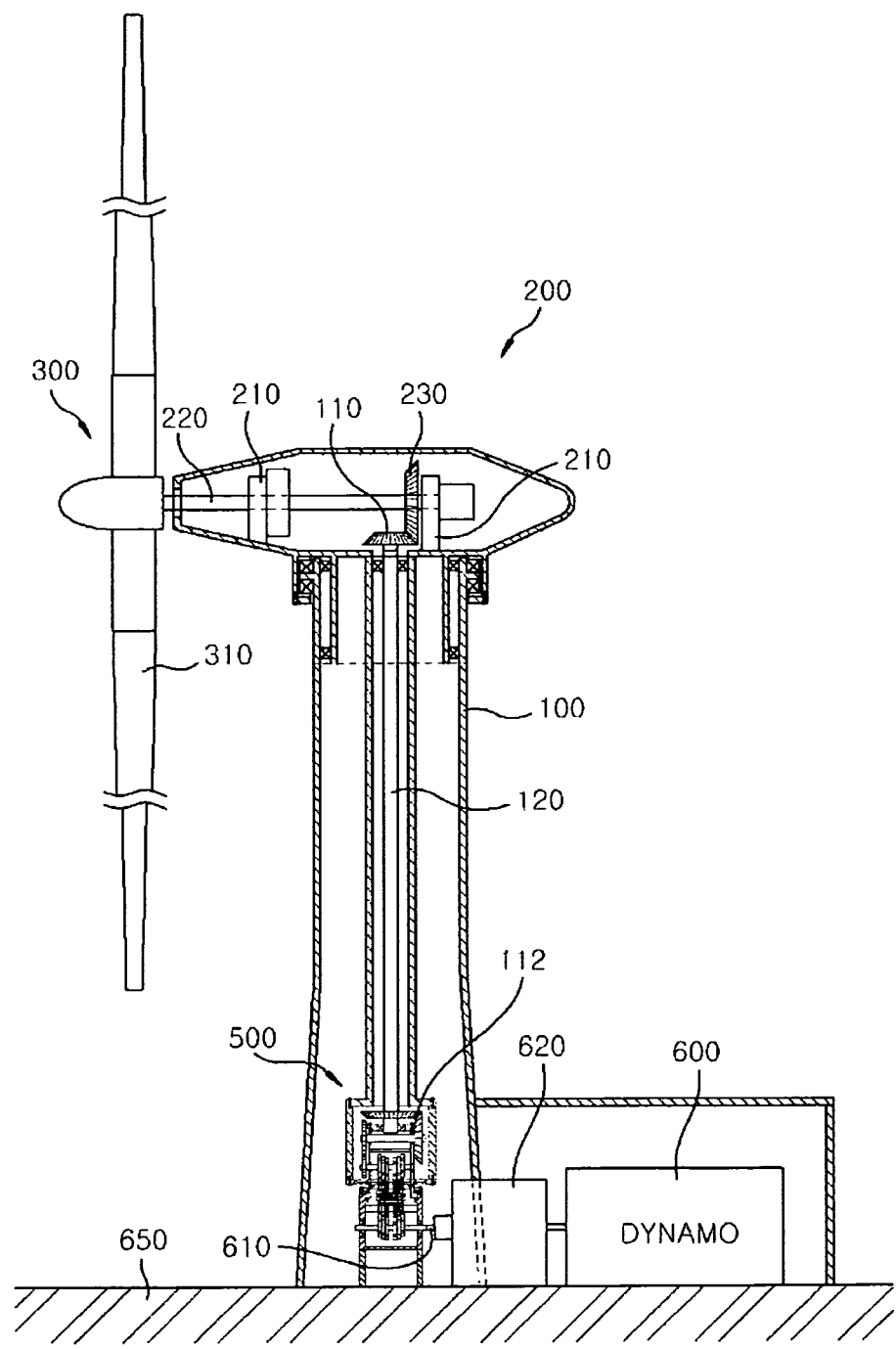
FIG. 4 is a side cross-sectional view showing a wind turbine according to an embodiment of the invention.
Figure 5:
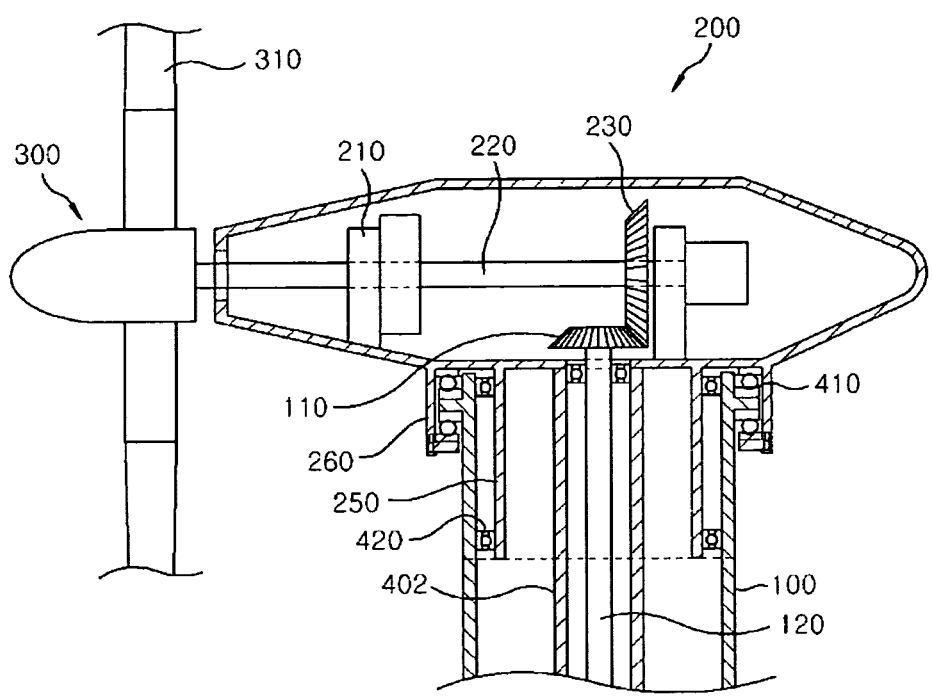
FIG. 5 is a detailed view showing the nacelle assembly and the upper portion of the tower shown in FIG. 4.
Figure 6:
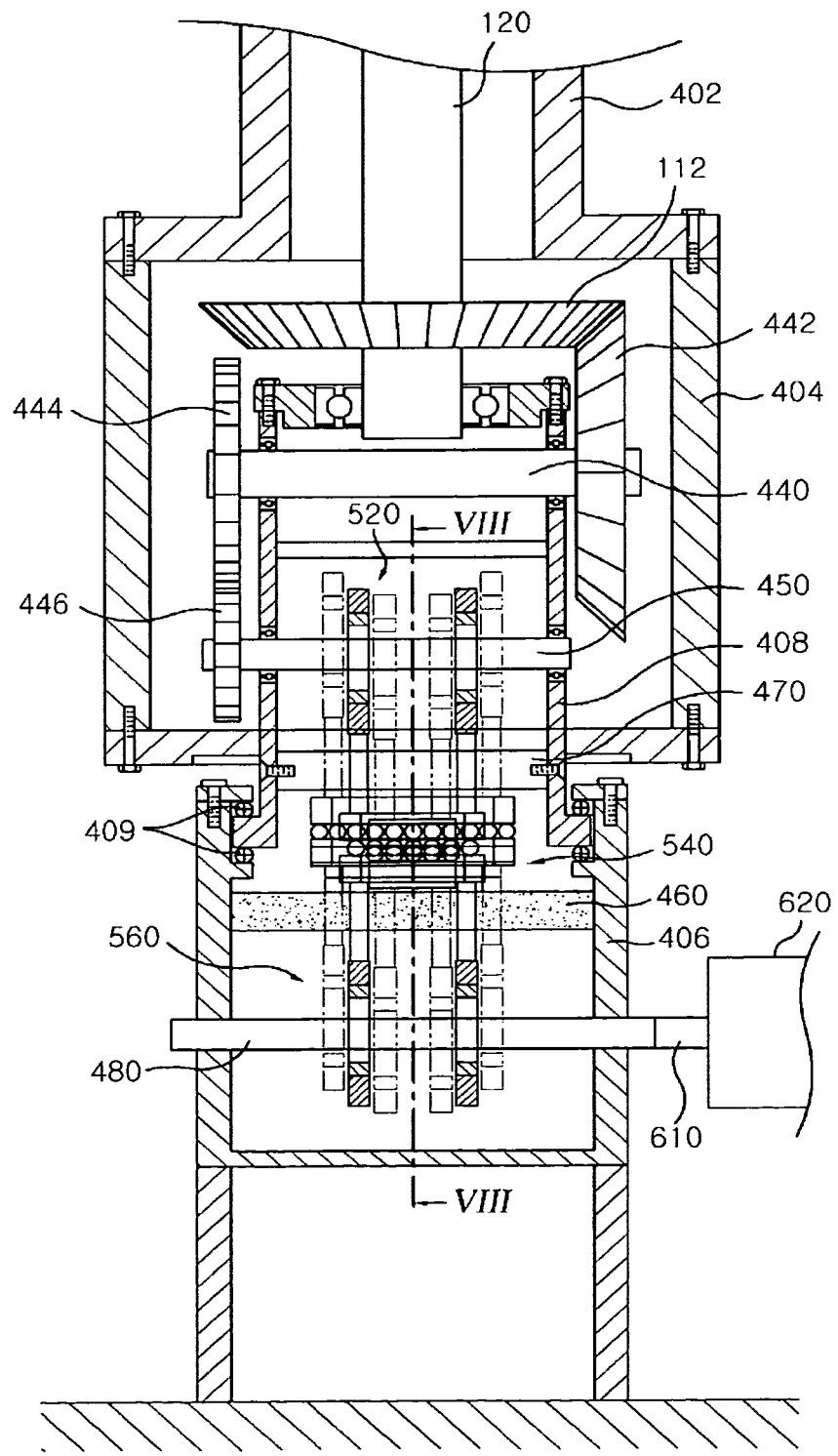
FIG. 6 is a schematic view showing the configuration of the repulsive torque-balancing mechanism, which is in the lower portion of the vertical shaft, shown in FIG. 4.
Figure 7:
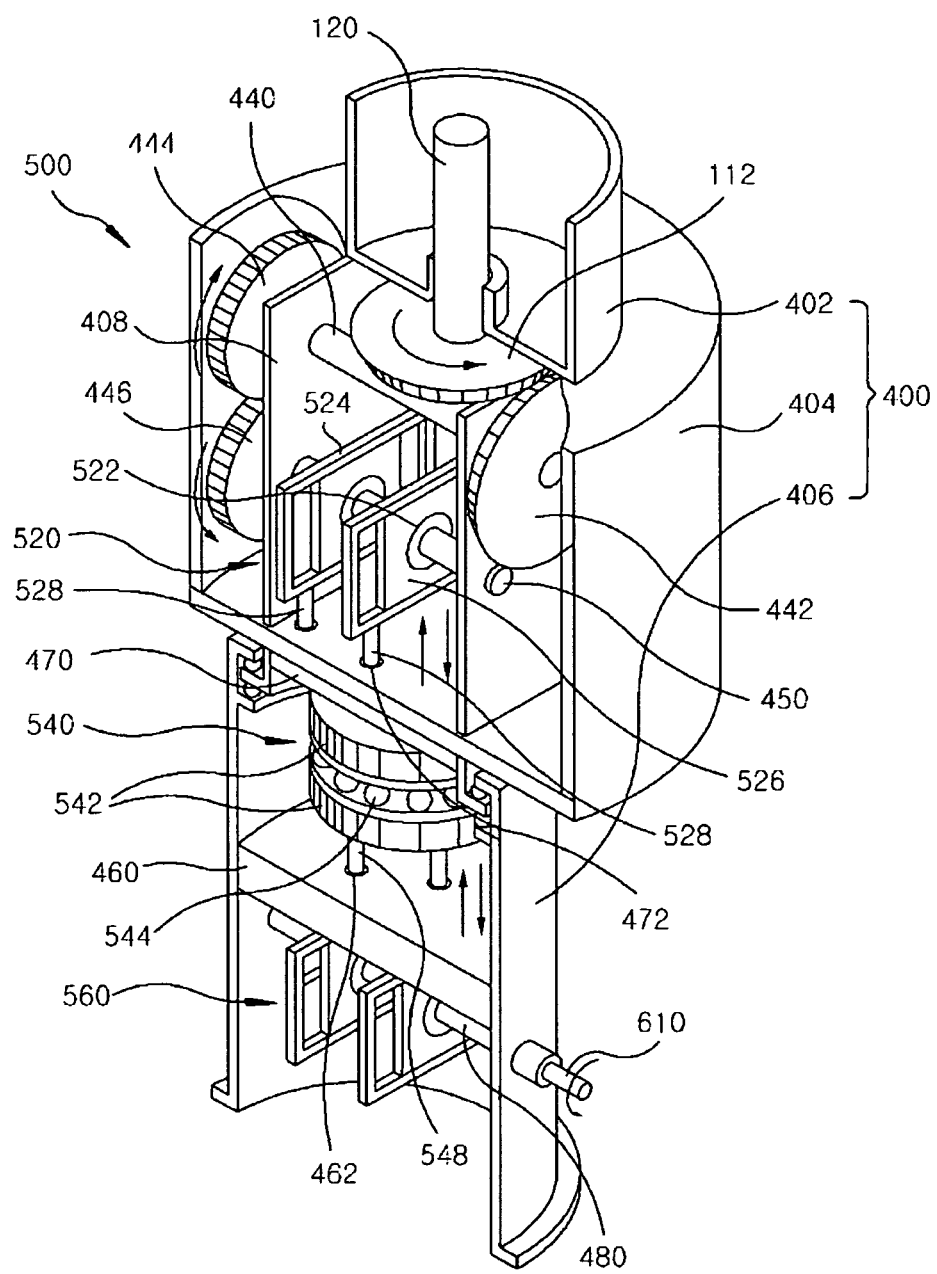
FIG. 7 is a schematic perspective view showing the construction of the yoke mechanism in the lower portion of the vertical shaft shown in FIG. 4.
Figure 8:
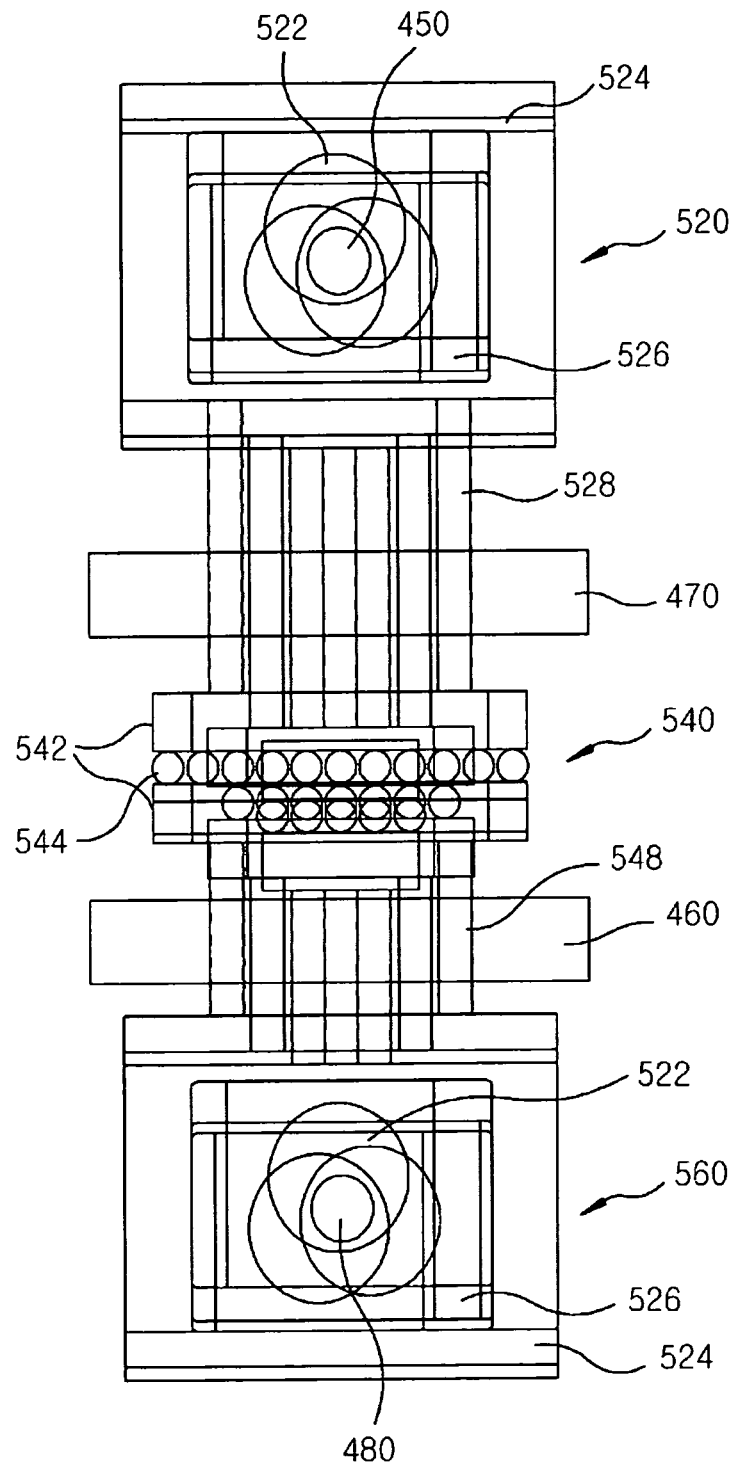
FIG. 8 is a cross-sectional view taken along line VIII-VIII in FIG. 6.
Figure 9:
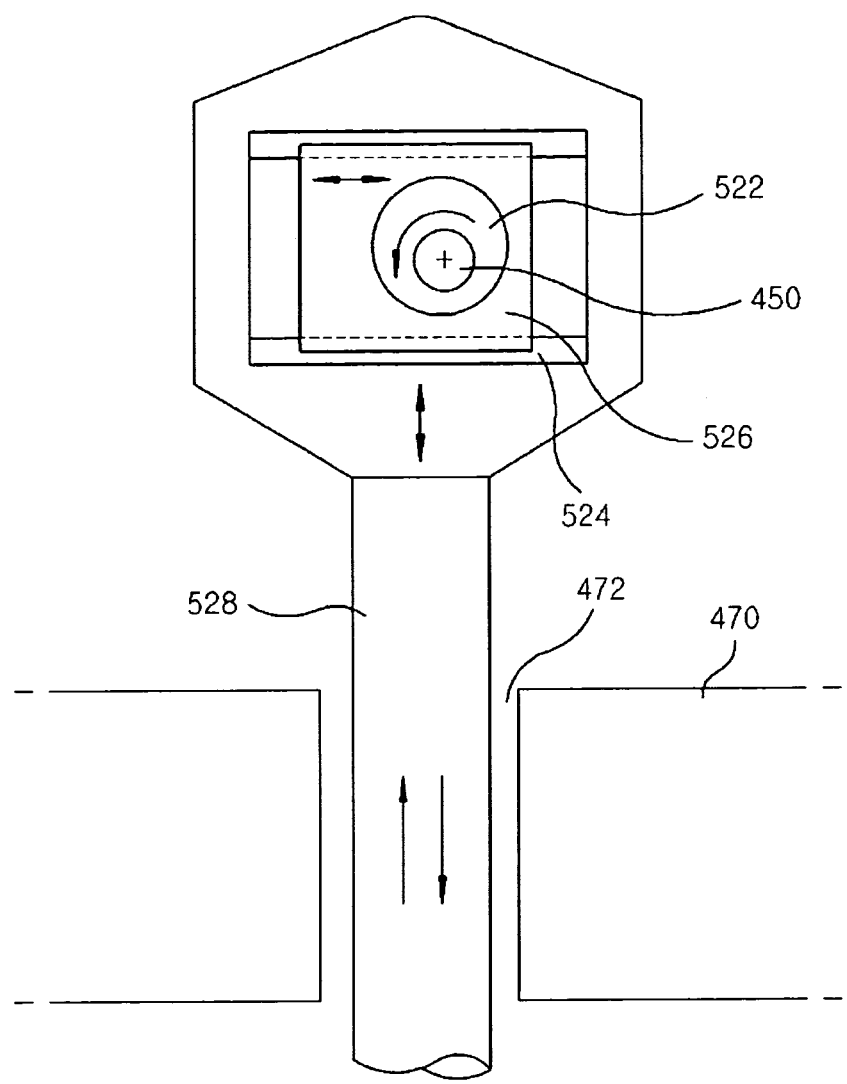
FIG. 9 is a schematic view explaining the configuration of the Scotch yoke, which converts the rotational motion of the vertical shaft into linear motion.

FIG. 4 is a side cross-sectional view showing a wind turbine according to an embodiment of the invention; FIG. 5 is a detailed view showing the nacelle assembly and the upper portion of the tower shown in FIG. 4; FIG. 6 is a schematic view showing the configuration of the repulsive torque-balancing mechanism in the lower portion of the vertical shaft, shown in FIG. 4; FIG. 7 is a schematic perspective view showing the construction of the yoke mechanism in the lower portion of the vertical shaft, shown in FIG. 4; FIG. 8 is a cross-sectional view taken along line VIII-VIII in FIG. 6; and FIG. 9 is a schematic view explaining the configuration of the Scotch yoke which converts the rotational motion of the vertical shaft into linear motion.

As shown in FIG. 4, the wind turbine of this embodiment of the invention includes a tower 100, a nacelle assembly 200, a rotor 300 and a dynamo 500. According to this embodiment, the dynamo 600 is placed near to a location at which the wind turbine is constructed, instead of being mounted inside the nacelle assembly 200. Here, the location corresponds to the ground 650 in the case in which the wind turbine is provided on the ground, or to the upper surface of a float that supports an offshore wind turbine in the sea. Further, the wind turbine includes a repulsive torque-balancing mechanism 500, which is provided inside the tower 100 to balance repulsive torque due to the load of a dynamo 600.

In addition, in the wind turbine, the nacelle assembly 200 is not provided with an active yawing system, but realizes a free yaw system, wherein the nacelle assembly 200 can move freely with respect to the tower 100 through a bearing, which is interposed between the nacelle assembly 200 and the tower 100. As shown in detail in FIG. 5, the nacelle assembly 200 includes an inner flange 250 and an outer flange 260 in the lower portion thereof. An inner bearing 420 is coupled between the upper inner surface of the tower 100 and the inner flange 250, and an outer bearing 410 is coupled between the upper outer surface of the tower 100 and the outer flange 260. Therefore, the wind turbine of this embodiment realizes a free yaw system by freely rotating the nacelle assembly 200 with respect to the tower 100 using only the reaction of the wind, which is applied to blades 310 and a tower hood 370 (see FIGS. 13B and 14B), which will be described later, without an active yawing system.

A main shaft 220 is rotatably provided inside the nacelle assembly 200 and is horizontally supported by a pair of support frames 210. One end of the main shaft 220 is connected to a rotor 300 to which the blades are attached, and the other end of the main shaft 220 is connected to a main shaft bevel gear 230. The main shaft 220 rotates when the wind rotates the blades 310.

A rotatable vertical tower shaft 120 is vertically provided inside the tower 100, and has upper and lower bevel gears 110 and 112 attached to its upper and lower ends. The upper bevel gear 110 engages with the main shaft bevel gear 230 of the main shaft 220. Therefore, the rotating force of the main shaft 220 is transferred to the vertical shaft 120.

The rotating force that is transferred to the tower shaft 120 passes through the repulsive torque-balancing mechanism 500, is accelerated in a speed-up gearbox 620 through an rotating shaft 610, and is then transferred to the dynamo 600.

As shown in FIGS. 4, 5 and 7, an inner housing 400 as a part of the repulsive torque-balancing mechanism is also provided inside the tower 100, and includes an upper hollow section 402, with the upper part thereof fixed to the bottom wall of the nacelle assembly 200, a middle shell 404, with the upper wall thereof fixed to the lower part of the upper hollow section 402, and a lower support 406, held under the casing 408, as shown in FIGS. 6 and 7. The vertical shaft 120 pass through inside the upper hollow section 402, and the lower bevel gear 112 of the vertical shaft 120 is positioned inside the middle shell 404. In addition, a first yoke unit 520 is positioned inside the middle shell 404, a second yoke unit 560 and a thrust bearing assembly 540, which is above the second yoke unit 560, are positioned inside the lower support 406. Each of the first and second yoke units 520 and 560 is a motion converting mechanism that converts rotational motion into linear reciprocal motion or vice versa, and but not limited thereto, for example, may include a Scotch yoke. Other examples of such a mechanism may include a pair formed by a crank and a connecting rod, a pair formed by a circular cam and a slider, a pair formed by a cam having a circular groove and a slider, a pair formed by a swash plate cam and a slider, etc.

A casing 408 has a lower end attached to the lower end of the middle shell 404. The lower end of the casing 408 is rotatably coupled to the lower support 406 by bearings 409. A horizontal rotary shaft 440 is rotatably supported in the casing 408. A casing bevel gear 442, which is engaged with the lower bevel gear 112 of the vertical shaft 120, is attached to one end of the horizontal rotary shaft 440, and a rotary gear 444 is attached to the other end of the horizontal rotary shaft 440. Further, a first cam rotary shaft 450 of the first yoke unit 520 is rotatably supported in the casing 408 such that it is parallel to the horizontal rotary shaft 440. A cam rotary gear 446, which is engaged with the rotary gear 444, is attached to one end of the first cam rotary shaft 450. A guide plate 470 is provided between the first yoke unit 520 and the thrust bearing assembly 540.

In the lower support 406, a guide plate 460 is provided between the thrust bearing assembly 540 and the second yoke unit 560. A second cam rotary shaft 480 of the second yoke unit 560 is connected to the rotating shaft 610.

As shown in FIGS. 6 to 8, the first yoke unit 520 includes one or more circular eccentric cams 522, one or more rectangular frames 524, and one or more one yokes 526. The circular eccentric cams 522 are fixed to the first cam rotary shaft 450, and include, preferably, three pairs of eccentric cams. The rectangular frames 524 are perpendicular to the first cam rotary shaft 450, with the first cam rotary shaft 450 extending through the inside thereof. The yokes 526 reciprocally move inside each rectangular frame 524, with each eccentric cam 522 fitted thereinto. Likewise to the circular eccentric cams, the rectangular frames 524 and the yokes 526 are comprised of three pairs, respectively. For simplicity of drawing, FIG. 7 illustrates only a pair of the circular eccentric cams 522, the rectangular frames 524 and the yokes 526. Connecting rods 528 are attached to the lower portion of each rectangular frame 524 such that they extend through holes 472 of the guide plate 470. Therefore, when the first cam rotary shaft 450 rotates, the yoke 526 reciprocally moves in the lateral direction inside the rectangular frame 524, so that the connecting rod 528 reciprocally moves in the vertical direction through each hole 472 of the guide plate 470 which will be discussed hereinafter. In this case, it is possible to more stably transfer power if the first yoke unit 520 includes a plurality of rectangular frames 524 and a plurality of eccentric cams 522. This is the same as in the second yoke unit 560. In addition, when the nacelle assembly 200 rotates freely, the connecting rod 528 is subjected to a greater shearing force as it is farther away from the center of the vertical shaft. Therefore, it is preferred that the number of connecting rods 528 attached to the rectangular frame 524 be increased as they become spaced farther away from the center of the vertical shaft 120.

As described above, the nacelle assembly 200 is connected integrally with the casing 408, which is attached to the middle shell 404, through the upper hollow section 402 and the middle shell 404. When the rotor 300 rotates in the wind, the nacelle assembly 200 is subject to repulsive torque, which occurs due to the load of the dynamo 600, while a rotating force derived from rotation of the rotor 300 is transferred to the casing 408. Consequentially, when it is said that the casing 408 gets the rotating force, it means that the torque of the rotating force that is in the direction opposite to that of the repulsive torque is transferred to the casing 408 through the lower bevel gear 112 of the vertical shaft 120 and the casing bevel gear 442, which is rotatably supported in the casing 408, thereby balancing the repulsive torque.

Following is a detailed description for the removal of the above-described phenomenon that the nacelle assembly 200 is forced to rotate in response to the repulsive torque due to the load of the dynamo 600.

The main shaft bevel gear 230 is subjected to the repulsive torque from the upper bevel gear 110, when the latter is driven by the former and the repulsive torque is transferred to a pair of the support frames 210 supporting the main shaft 220, acting as a force to cause rotation of the nacelle assembly 200. In this case, the direction of the repulsive torque to the nacelle assembly 200 is opposite to the direction in which the upper bevel gear 110 rotates with the rotating force derived from rotation of the rotor 300.

Following is a description of the operation, after the torque of the rotating force derived from rotation of the rotor 300 that is in the direction opposite to the direction of the repulsive torque is applied to the lower bevel gear 112 of the vertical shaft 120.

The casing 408 is subject to the torque of the rotating force derived from rotation of the rotor 300 in the direction opposite to the direction of the repulsive torque, as the horizontal rotary shaft 440 rotatably supported in the casing 408 is subject to the torque through the lower bevel gear 112 and the casing bevel gear 442 attached to the horizontal rotary shaft 440. The direction of the torque to the casing 408 applied via the lower bevel gear 112 is opposite to the direction of the repulsive torque. That is, the torque in a direction to balance the repulsive torque is transferred to the casing 408 via the lower bevel gear 112, thereby deactivating the repulsive torque.

The thrust bearing assembly 540 includes a pair of upper and lower circular pushers 542 that are coupled to the lower portion of the connecting rods 528, and a thrust bearing 544 interposed between the circular pushers 542. Connecting rods 548 are connected to the lower portion of the lower circular pusher 542 such that they extend through holes 462 of the guide plate 460. When the upper circular pusher 542 is pressed by the vertical reciprocal motion of the connecting rods 528, the lower circular pusher 542 is pressed via the thrust bearing 544, so that the connecting rods 548 vertically reciprocate through the holes 462 of the guide plate 460.

When the nacelle assembly 200 rotates following the direction of the wind, the connecting rods 528 also rotate. Thus, the thrust bearing 544 allows the connecting rods 528 to linearly reciprocate while rotating freely with respect to the lower support 406.

The second yoke unit 560 have the same components as those of the first yoke unit 520 described above. However, the second yoke unit 560 operates opposite to the first yoke unit 520. More specifically, when the connecting rods 548 vertically reciprocate through the holes 462 of the guide plate 460, the yoke 526 reciprocally moves inside the rectangular frame 524. This causes the eccentric cam 522 to rotate and then the second cam rotary shaft 480 to rotate, thereby rotating the rotating shaft 610.

Below, a description will be given of the operation of the wind turbine of this embodiment configured as above.

When the wind rotates the blades 310 of the rotor 300 at a velocity of for example 4 m/s or more, the main shaft 220 of the nacelle assembly 220 is made to rotate. The rotating force of the main shaft 220 is transferred to the vertical shaft 120 via the upper bevel gear 110 of the vertical shaft 120, which is engaged with the main shaft bevel gear 230 attached to the main shaft 220. Subsequently, the horizontal rotary shaft 440 and the first cam rotary shaft 450 are rotated by the casing bevel gear 442, which is engaged with the lower bevel gear 112 of the vertical shaft 120, thereby causing the eccentric cams 522 to rotate. The rotation of the eccentric cams 522 causes the yoke 526 to reciprocally move inside the rectangular frame 524, so that the connecting rods 528 of the first yoke unit 520 vertically reciprocate. As a result, the upper circular pusher 542 performs vertical reciprocal motion, which is in turn transferred via the thrust bearing 544 to the lower pusher 542, so that the lower pusher 542 vertically reciprocates accordingly. Afterwards, the connecting rods 548 of the second yoke unit 560 vertically reciprocate through the holes 462 of the guide plate 460. Accordingly, the yoke 526 reciprocally moves inside the rectangular frame 524, and then the eccentric cam 522 rotates. This causes the second cam rotary shaft 480 to rotate, thereby rotating the rotating shaft 610.

The repulsive torque due to the load of the dynamo 600 connected to the rotating shaft 610 is balanced when the torque that is in the direction opposite to that of the repulsive torque is transferred to the vertical shaft 120 via the casing bevel gear 442, which is rotatably supported in the casing 408 connected to the nacelle assembly 200, as described above.

Even when the direction of the wind changes, thanks to the outer and inner bears 410 and 420 interposed between the nacelle assembly 200 and the tower 100, a bearing interposed between the middle shell 404 and the lower support 406, and the thrust bearing 544, the nacelle assembly 200 can face the windward direction freely with respect to the tower 100.

Accordingly, as the nacelle assembly 200 rotates to face the wind, the rotating shaft 610 drives the dynamo 600 by increasing the number of rotations using the speed-up gearbox 620.

Figure 10:
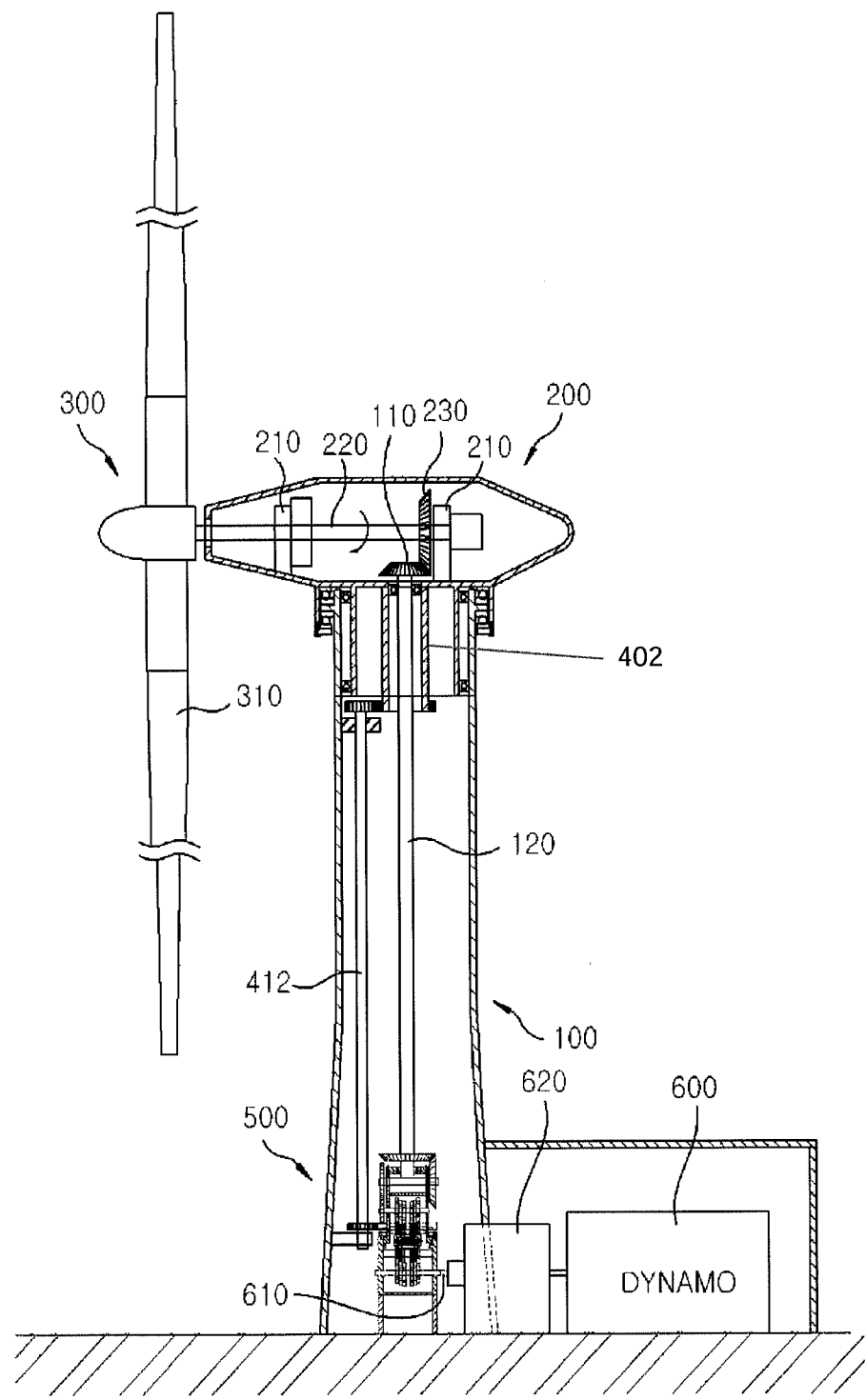
FIG. 10 is a side elevation view showing a wind turbine according to a second embodiment of the invention.
Figure 11:
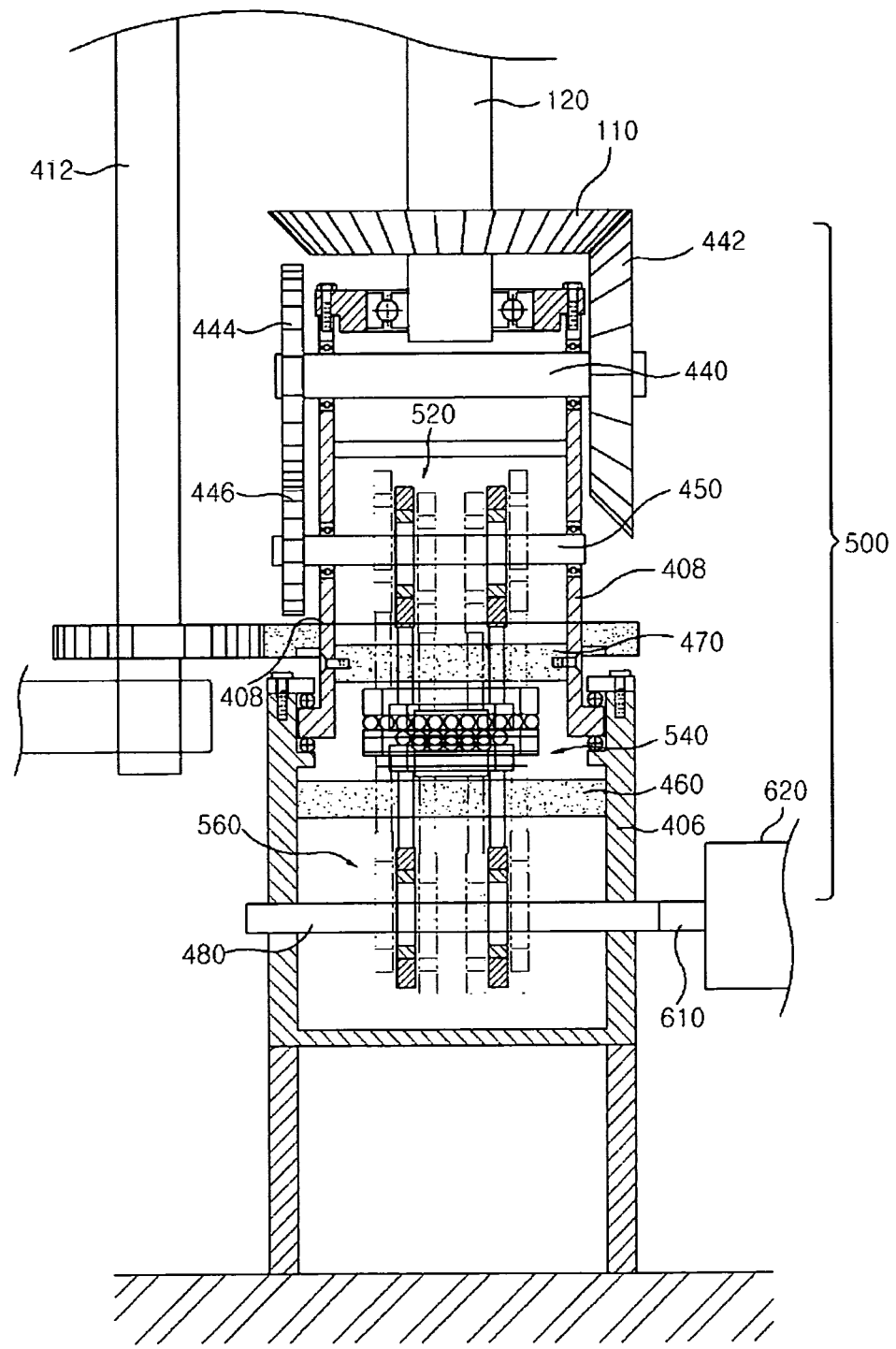
FIG. 11 is a schematic view showing the configuration of the repulsive torque-balancing mechanism in the lower portion of the vertical shaft shown in FIG. 10.

FIG. 10 is a wind turbine according to a second embodiment of the invention, and FIG. 11 shows the detailed configuration of the repulsive torque-balancing mechanism 500 in combination with the lower portion of the vertical shaft 120, as shown in FIG. 10.

The second embodiment of the invention comprises a repulsive torque-balancing mechanism 500 provided with a combination of an upper hollow section 402 and a rotative shaft 412 as shown in FIGS. 10 and 11, replacing the combination of the upper hollow section 402 and the middle shell 404 of the first embodiment of the invention, as shown in FIG. 7.

The repulsive torque-balancing mechanism of the second embodiment is substantially identical to that of the first embodiment, except that the upper hollow section 402 is resized, such that a lower portion of upper hollow section 402 and the middle shell 404 is removed and replaced by the rotative shaft 412, which is engaged with the casing 408. The opposite ends of the rotative shaft 412 are rotatably combined with the upper hollow section 402 and the casing 408 by a pair of an upper ring gear and an upper pinion gear and another pair of a lower ring gear and a lower pinion gear, respectively. Therefore, a detailed description for the second embodiment will be omitted.

It will be appreciated to those skilled in the art that the rotative shaft 412 may be engaged with the upper hollow section 402 and the casing 408 by means of belts and/or chains, as well as gears, as shown in FIG. 11.

Figure 12A:
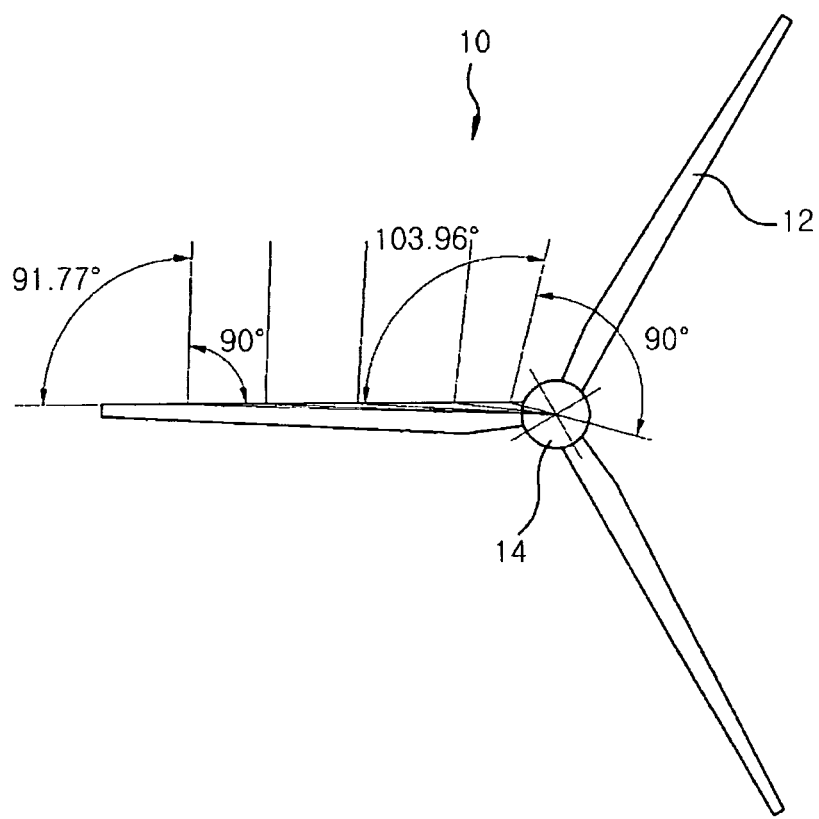
FIGS. 12A and 12B are views showing linear blades of the related art and swept-back wing type blades according to an embodiment of the invention, respectively.
Figure 12B:
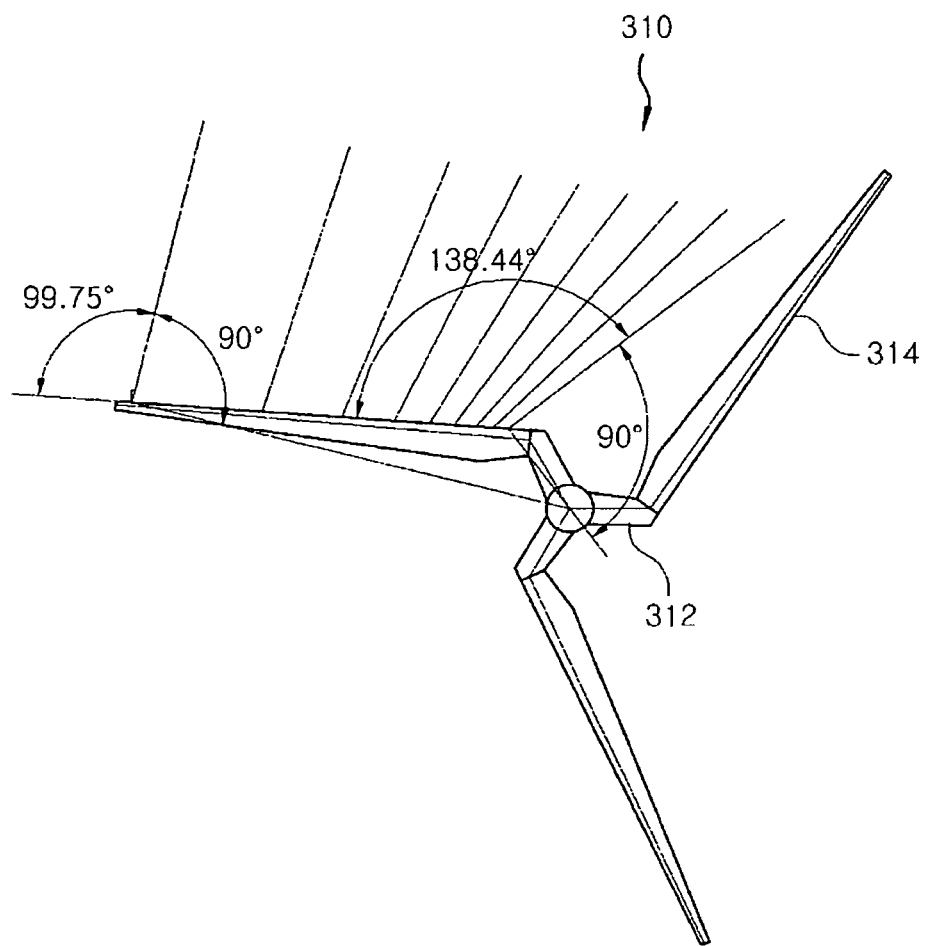
Figure 13A:
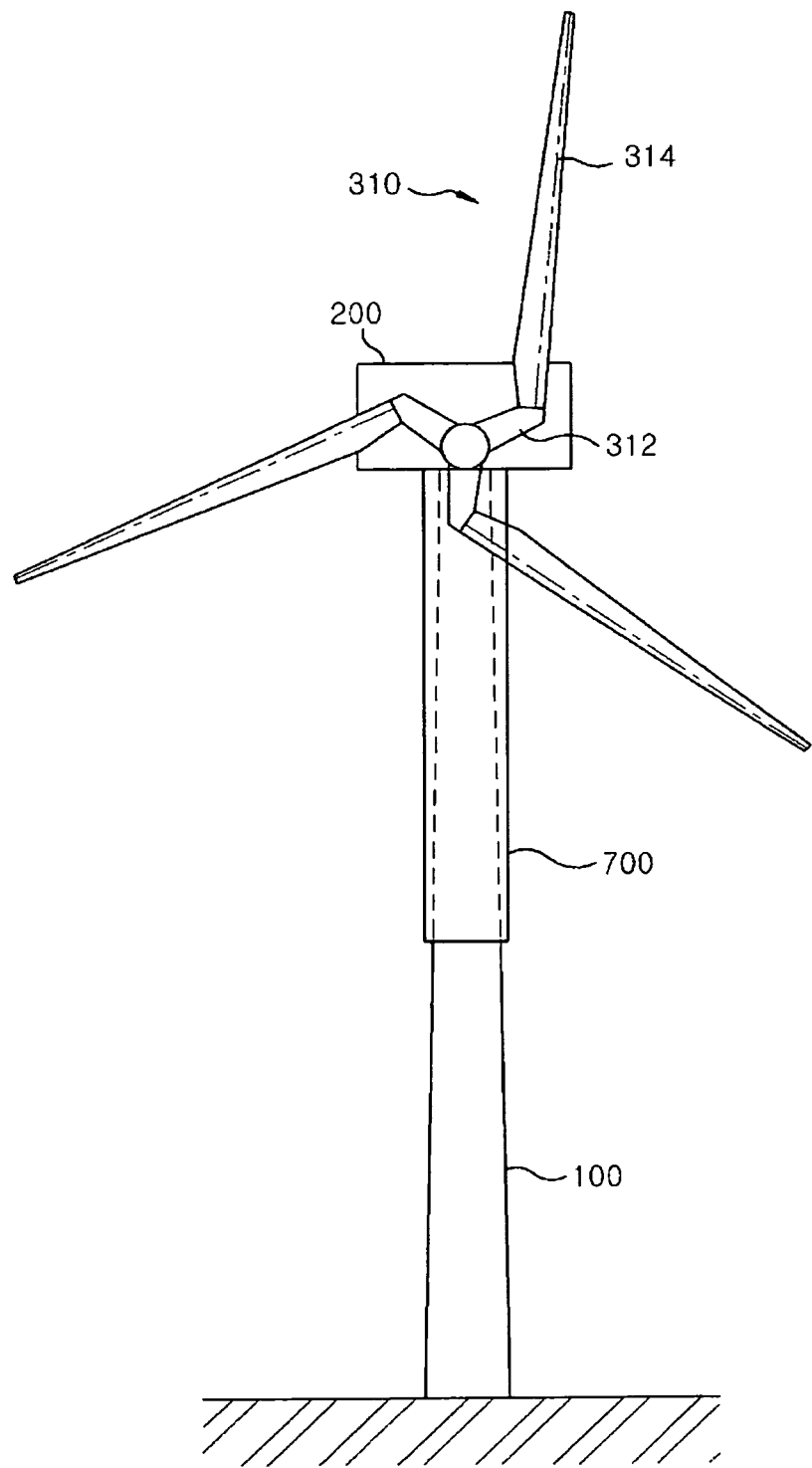
FIGS. 13A and 13B are rear and side elevation views showing the state in which the swept-back wing type blades shown in FIG. 12B and a tower hood, which is designed to remove an air vortex, are mounted on the nacelle assembly, respectively.
Figure 13B:
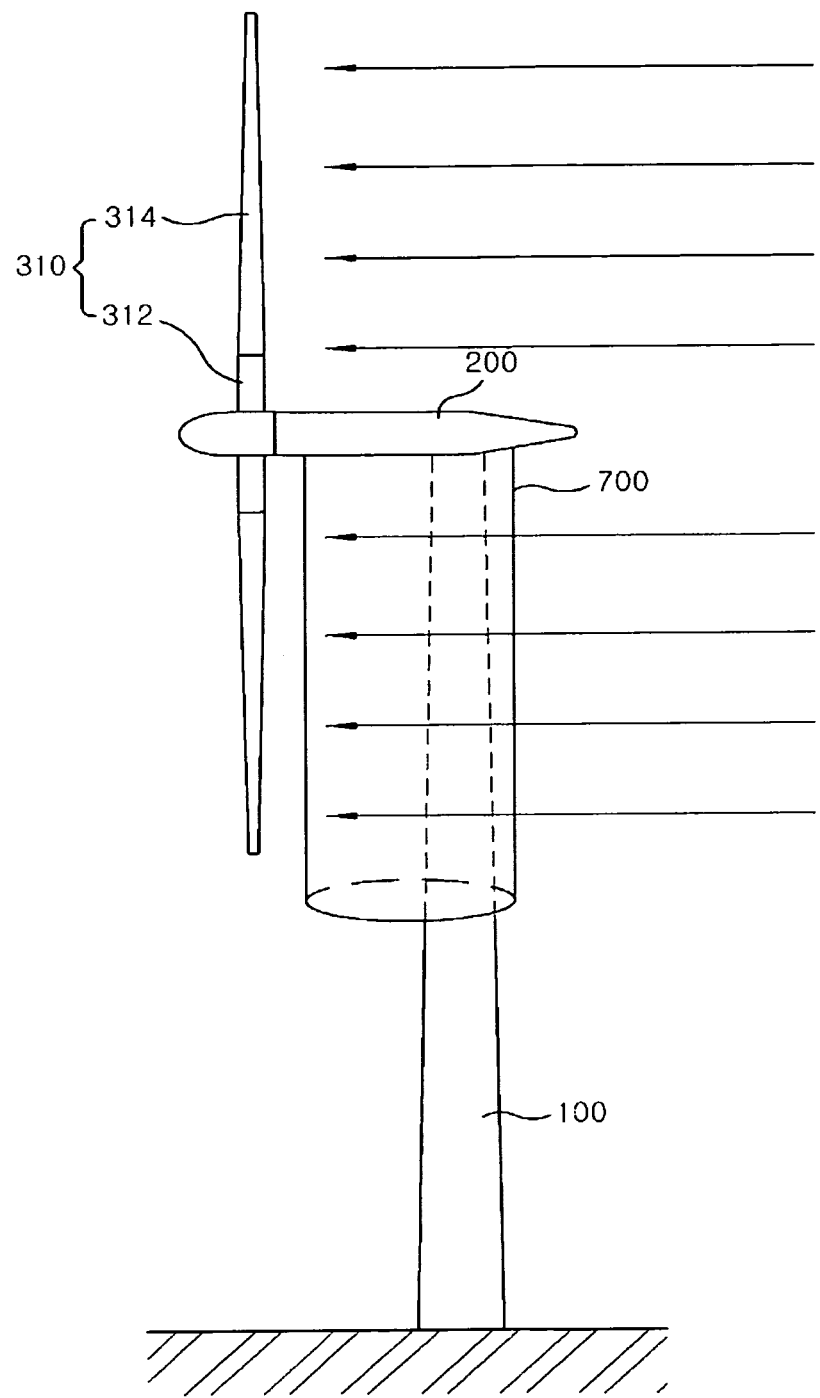

FIGS. 12A and 12B are views comparing linear blades of the related art and swept-back wing type blades according to an embodiment of the invention, respectively; and FIGS. 13A and 13B are rear and side elevation views showing the state in which the swept-back wing type blades shown in FIG. 12B and a tower hood, which is designed to remove an air vortex, are mounted on the nacelle assembly, respectively.

It is preferred that the wind turbines according to embodiments of the invention use the rotor 300, which includes the swept-back wing type blades 310 shown in FIG. 12B. Such swept-back wing type blades 310 include hub-attached portions 312 and bent portions 314. The hub-attached portions 312 are attached to the hub-cone assembly at equal intervals, and each free end of the attached portions 312 is bent backwards from each outer end of the hub-attached portions 312 at a predetermined angle. The rotor 300 having the swept-back wing type blades 310 increases efficiency and reduces reaction noise, since it reduces reaction resistance to be smaller than that of the linear wing type rotor of the related art. It also significantly reduces low-frequency noise, since the swept-back wing type blades 310 gradually pass through a low pressure area, which is formed in the backwash of the tower.

Figure 14A:
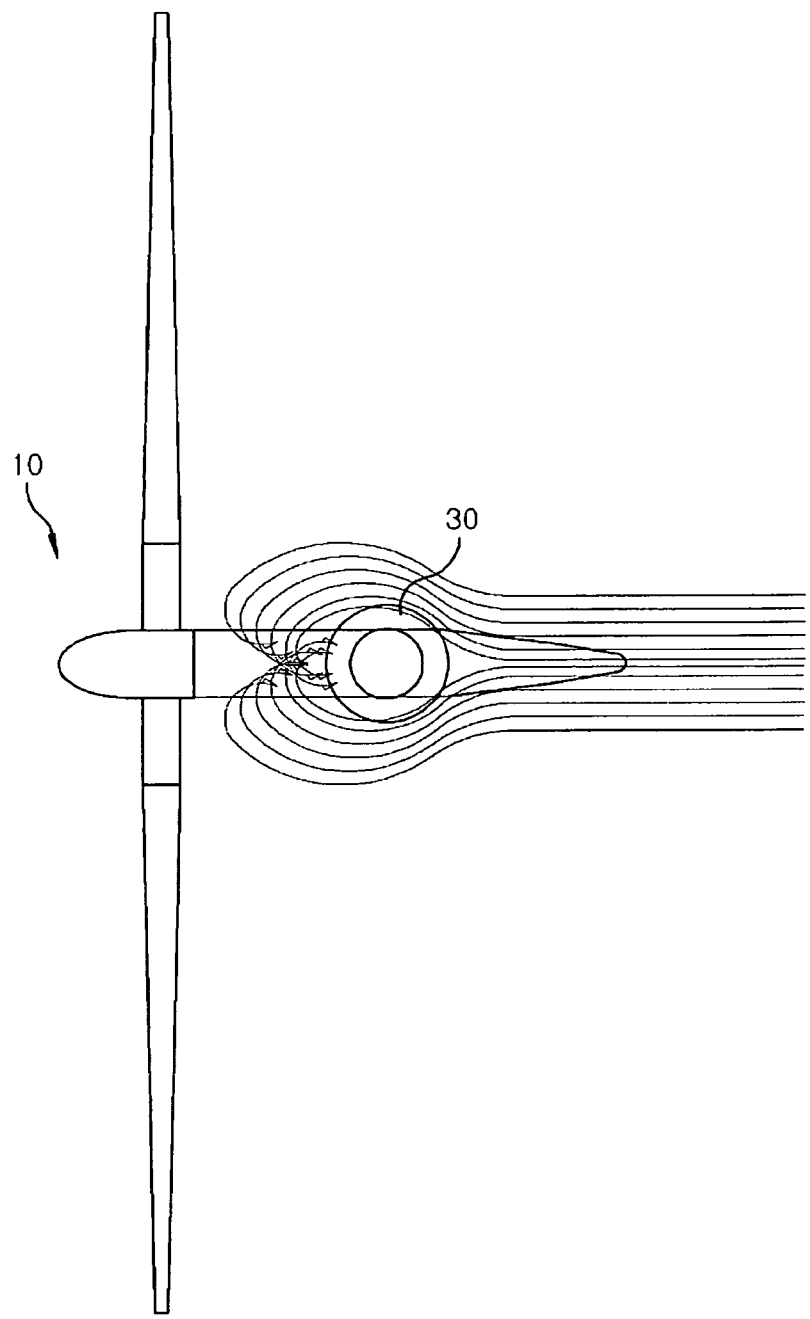
FIGS. 14A and 14B are a plan view showing the flow of air when no tower hood is mounted and a plan view showing the flow of air when the tower hood shown in FIGS. 13A and 13B has been mounted, respectively.
Figure 14B:
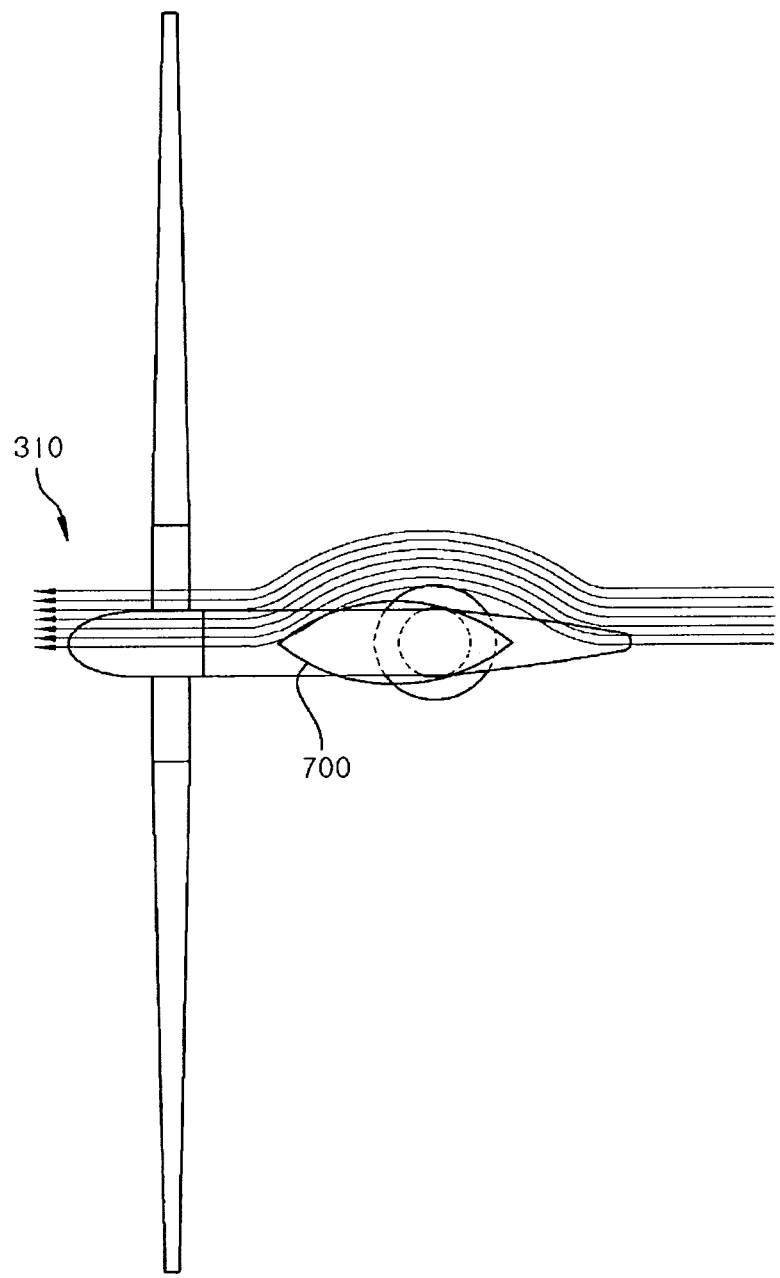

As shown in FIG. 14B, the wind turbine of the invention also includes a tower hood 700, which is attached to the lower end of the nacelle assembly 200, and surrounds the upper portion of the tower 100. When viewed from above, the tower hood 700 has an elongated shape and is positioned to be eccentric with respect to the tower 100. To be more specific, the tower hood 700 is eccentrically positioned in the upwind direction with respect to the tower 100, i.e., in the direction opposite to the rotor 310. The tower hood 700 functions to induce a flow of air surrounding the tower 100 by rotating along with the nacelle assembly 200.

According to the present invention, the nacelle assembly 200 is lightweight since neither the dynamo nor the active yawing system is mounted. Thus, the nacelle assembly 200 can rotate with low moment inertia depending on a shift of the wind, thereby reducing the time over which a yaw error persists. Furthermore, since the nacelle assembly 200 having the eccentric tower hood 700 can rapidly face downwind, it is possible to additionally reduce the time in which a yaw error occurs.

FIG. 14A is a plan view showing a flow of air in which the tower hood shown in FIG. 13B is not mounted, and FIG. 14B is a plan view showing a flow of air in which the tower hood shown in FIG. 13B is mounted. As shown in FIG. 14A, an air vortex forms a low pressure area in the backwash of the tower. However, as shown in FIG. 14B, the low pressure area in the backwash of the tower formed by the air vortex is removed. This reduces noise, which would otherwise occur when the blades pass through the backwash of the tower in the case of downwind, and reduces the stress put on the blades, which is caused by the low pressure area, to reduce fatigue, thereby preventing the blades from being damaged.

According to the embodiments of the invention as set forth above, the rotation energy of the rotor is transferred to the dynamo, which is provided on the ground, through the rotatable vertical shaft, which is vertically provided inside the tower. Here, the repulsive torque that the vertical shaft is subjected to is balanced using the repulsive torque-balancing mechanism, and free yaw is realized. Therefore, greater output can be produced using equipment that is simpler compared to that of the related art.

In addition, although the invention has been described with respect to the downwind type wind turbine, the repulsive torque-balancing mechanism can also be used in an upwind type wind turbine. In case of the upwind type wind turbine, an active yawing system can be added thereto.

While the invention has been shown and described with respect to the preferred embodiments, it will be understood by those skilled in the art that various changes and modifications may be made without departing from the spirit and scope of the invention as defined in the following claims.

The invention claimed is:

1. A horizontal-axis wind turbine comprising:
    a rotor having a hub and blades rotatable by wind;
    a nacelle assembly for rotatably supporting the rotor through a main shaft, the main shaft being connected to the rotor;
    a tower for rotatably supporting the nacelle assembly;
    a dynamo placed near to a location at which the tower is built up;
    a rotatable vertical shaft placed inside the tower and orthogonally disposed to the main shaft for transferring a rotating force of the main shaft to the dynamo; and
    a repulsive toque-balancing mechanism for transferring a rotating force of the nacelle assembly, the rotating force of the nacelle assembly being derived from repulsive torque due to a load of the dynamo, to the vertical shaft in a direction in which the repulsive toque is balanced, which comprises:
        an upper hollow section fixed to the bottom wall of the nacelle assembly in the tower;
        a casing combined to the upper hollow section and disposed under the vertical shaft for rotatably supporting a horizontal shaft, wherein the horizontal shaft is engaged with the vertical shaft and is orthogonal to the vertical shaft;
        a lower support orthogonally disposed with respect to the vertical shaft for rotatably supporting the casing, and for rotatably supporting a rotating shaft of the dynamo; and a transferring unit for transferring the rotating force of the nacelle assembly to the casing.

2. The horizontal-axis wind turbine of claim 1, further comprising a motion converting mechanism for transferring a rotating force of the horizontal shaft, which is rotatable with respect to the vertical shaft, to the rotating shaft of the dynamo, wherein the motion converting mechanism includes:
 a first converting section for converting the rotating force of the horizontal shaft into a linear reciprocal motion that intersects a direction of the vertical shaft at right angles;
 a second converting section for converting the linear reciprocal motion into a rotating force and transfers the rotating force to the rotating shaft of the dynamo; and
 a thrust bearing assembly connected between the first and second converting sections, and being rotatable with respect to the vertical shaft.

3. The horizontal-axis wind turbine of claim 2, wherein each of the first and second converting sections includes a Scotch yoke.

4. The horizontal-axis wind turbine of claim 1, the horizontal-axis wind turbine comprises a downwind type wind turbine.

5. The horizontal-axis wind turbine of claim 4, further comprising a tower hood, the tower hood is attached to a lower end of the nacelle assembly, surrounds an upper portion of the tower, and is positioned to be eccentric in a direction opposite the rotor with respect to the tower.

6. The horizontal-axis wind turbine of claim 1, wherein the horizontal axis wind turbine comprises an upwind type wind turbine.

7. The horizontal-axis wind turbine of claim 1, wherein the wind turbine comprises an offshore wind turbine in the sea, and the location at which the tower is built up includes an upper surface of a float supporting the offshore wind turbine.

8. The horizontal-axis wind turbine of claim 1, wherein the transferring unit for transferring the rotating force of the nacelle assembly to the casing is a middle shell disposed and fixed between the upper hollow section and the casing to be connected to the upper hollow section.

9. The horizontal-axis wind turbine of claim 1, wherein the transferring unit for transferring the rotating force of the nacelle assembly to the casing is a rotative shaft rotatably arranged between the upper hollow section and the casing to be connected to the upper hollow section.

* * * * *